United States Patent [19]

Matsumoto et al.

[11] Patent Number: 5,124,164
[45] Date of Patent: Jun. 23, 1992

[54] METHOD FOR PRESERVING FRESH MARINE PRODUCTS WITH USE OF A DEOXIDANT

[75] Inventors: Mutsumi Matsumoto; Masanobu Ogawa; Keiko Nakano, all of Gunma, Japan

[73] Assignee: Nippon Kayaku Kabushiki Kaisha, Tokyo, Japan

[21] Appl. No.: 579,881

[22] Filed: Sep. 7, 1990

Related U.S. Application Data

[62] Division of Ser. No. 433,367, Nov. 8, 1989.

[30] Foreign Application Priority Data

| Nov. 16, 1988 | [JP] | Japan | 63-287813 |
| Dec. 5, 1988 | [JP] | Japan | 63-305996 |
| Dec. 6, 1988 | [JP] | Japan | 63-306930 |

[51] Int. Cl.$^5$ ............................................. A23B 4/00
[52] U.S. Cl. ................................. 426/398; 426/124; 426/129; 426/418; 426/541
[58] Field of Search ............... 426/109, 398, 124, 129, 426/541, 393, 418; 62/60

[56] References Cited

U.S. PATENT DOCUMENTS

| 1,016,627 | 2/1912 | Higgins | 426/109 |
| 3,365,307 | 1/1968 | Dixon | 426/418 |
| 4,299,719 | 11/1981 | Aoki et al. | 426/124 |
| 4,406,813 | 9/1983 | Fujishima et al. | 426/541 |
| 4,524,015 | 7/1985 | Takahashi et al. | 252/188.28 |
| 4,711,741 | 12/1987 | Fujishima et al. | 252/188.28 |
| 4,762,722 | 8/1988 | Izumimoto et al. | 426/124 |
| 4,836,952 | 6/1989 | Nasu et al. | 252/188.28 |

FOREIGN PATENT DOCUMENTS

| 827504 | 11/1969 | Canada | 426/109 |
| 0150222 | 8/1985 | European Pat. Off. | |
| 0261422 | 3/1988 | European Pat. Off. | |
| 58-158129 | 9/1983 | Japan | |
| 62-102829 | 5/1987 | Japan | |
| 63-198938 | 8/1988 | Japan | |
| 63-233748 | 9/1988 | Japan | |

OTHER PUBLICATIONS

Journal of Food Sciences, vol. 47 (1982) May–Jun., No. 3. Storage Characteristics of Brown Shrimp (*Penaeus aztecus*) Stored In Retail Packages Containing $CO_2$-Enriched Atmospheres.

*Primary Examiner*—Donald E. Czaja
*Assistant Examiner*—Jean L. Aberle
*Attorney, Agent, or Firm*—Nields & Lemack

[57] ABSTRACT

A preserving agent for fresh marine product comprising (A) at least one salt selected from the group consisting of chlorates, chlorites and hypochlorites; (B) iron powder; and (C) at least one oxide selected from the group consisting of ferric oxide, cobalt oxide, nickel oxide, zinc oxide, titanium oxide, zirconium oxide, germanium oxide, copper oxide, silver oxide and manganese oxide and a method of preserving fresh marine products using the preserving agent;

a method for preserving crustaceans which comprises putting crustaceans into a container, covering the container, and quickly adjusting the oxygen concentration within the container to 0.5 to 5 vol %; and a container for preserving fresh marine products in the state of being packed with ice, comprising a receptacle in which said fresh marine products are placed and which has at the bottom thereof at least one hole for draining water therethrough, a removable or hinged lid, and a water-permeable material which is placed so as to drain water therethrough and prevent air outside said container from entering therethrough into said container, and a method of preserving fresh marine products using the container are disclosed.

4 Claims, 1 Drawing Sheet

METHOD FOR PRESERVING FRESH MARINE PRODUCTS WITH USE OF A DEOXIDANT

This application is a divisional of application Ser. No. 433,367 filed Nov. 8, 1989.

BACKGROUND OF THE INVENTION

The present invention relates to a preserving agent, a method and a container for maintaining the freshness of fresh marine products and particularly, preventing the change of color thereof when they are kept in cold storage in the raw state.

The color of the body of a marine product generally changes rapidly after the death. Since the change of color is related to the loss of freshness and leads to the degradation of the commercial value, prevention of change of color of marine products is an important problem to be solved. Change of color occurs in various marine products. They include crustaceans such as lobster, shrimp, prawn and crab, what is called red body fishes such as red sea bream (Madai), red rockfish (Menuke), bluefin searobin (Hobo) and alfonsino (Kinmedai), what is called white meat fishes such as cod and flatfish, tuna meat, bonito meat, sardine, mackerel, squid, cuttlefish and scallop.

For example, the colors of raw crustaceans such as lobster, shrimp, prawn and crab are apt to be changed into blackish colors soon after fishing, whereby the commercial value is greatly lowered. The portions at which the color is changed into blackish color is mainly the head portion in the case of lobster, shrimp or prawn and leg joint portions in the case of crab. The color is changed into blackish color because tyrosine in the body finally produces melanine polymer by the action of an oxidizing enzyme tyrosinase and the like in the presence of oxygen. It is therefore possible to prevent the color from changing into blackish color either by inactivating the enzyme by heating or by depressing the action of the enzyme by freezing. In the case of distributing crustaceans in the raw state, however, these methods cannot naturally be adopted. As a method of preventing the color of crustaceans from changing into blackish color in the raw state, if it is assumed to be one, a method of immersing crustaceans in a solution of an organic acid such as citric acid by utilizing the fact that tyrosinase is inactivated at a pH of not more than 5 is known. A method of immersing crustaceans in an aqueous sodium hydrogensulfite solution is also known. Both of these methods have insufficient effects and particularly the latter method has a problem in the regulation of residual $SO_2$. In fact, it is the present state of art that there is no effective method other than shortening the distribution period from fishermen to consumers.

The red color of red fishes such as red sea bream is derived from red carotenoid pigments. Carotenoids are easily oxidized, thereby fading in color. As a countermeasure, red sea bream is immersed in a solution of reductive sodium ascorbate or an antioxidant is added to red sea bream. However, treatment with chemicals is sometimes undesirable and the effect thereof cannot be said sufficient.

In some marine products such as tuna meat, myoglobin which presents scarlet color is oxidized and changed into methomyoglobin which presents brown color. Fishes such as sardine and mackerel change the color into brownish color by browned substances which are formed when the lipid in the fish meat is oxidized.

Since the change of color in fresh marine products is often caused by oxidation, as described above, use of a deoxidant has been proposed. However, not only low deoxidizing ability of conventional deoxidants at a low temperature under the cold-storage conditions but also a conventional method of merely removing oxygen still has a problem from the point of view of the total maintenance of the freshness although the change of color can be prevented. Thus, the improvement on maintaining the freshness of marine products has been demanded.

As described above, in the case of distributing fresh marine products in the raw state, the limitation of time for maintaining the freshness is one or two days even they are kept in cold storage, and if the time exceeds the limitation, the color changes. Therefore, if there is some trouble in transportation on the way, the commercial value is greatly lowered. Transportation from remote districts which require a long time is often impossible in the present state of art.

Accordingly, it is an object of the present invention to solve the above-described problems in the prior art and to provide a preserving agent, a method and a container for preventing the freshness of fresh marine products from lowering and, in particular, preventing the change of color of the body thereof.

SUMMARY OF THE INVENTION

In a first aspect of the present invention, there is provided a preserving agent for fresh marine products comprising (A) at least one salt selected from the group consisting of chlorates, chlorites and hypochlorites; (B) iron powder; and (C) at least one oxide selected from the group consisting of ferric oxide, cobalt oxide, nickel oxide, zinc oxide, titanium oxide, zirconium oxide, germanium oxide, copper oxide, silver oxide and manganese oxide and a method (I) for preserving fresh marine products using the preserving agent.

In a second aspect of the present invention, there is provided a method (II) for preserving fresh crustaceans which comprises the steps of putting the fresh curstaceans into a container, sealing up the container or covering the container with a lid, and quickly adjusting the oxygen concentration within the container to 0.5 to 5 vol %.

In a third aspect of the present invention, there is provided a container for preserving fresh marine products, which can be used in the above two methods and a method for preserving fresh marine product by using the container.

BRIEF DESCRIPTION OF THE DRAWING

In FIG. 1, 1 is a container, 2 is a hole for draining water therethrough, 3 is unwoven cloth, 4 is ice, 5 and 7 are partitions, 6 is fresh marine products to be preserved and 8 is a deoxidant.

DETAILED DESCRIPTION OF THE INVENTION

Figure 1:
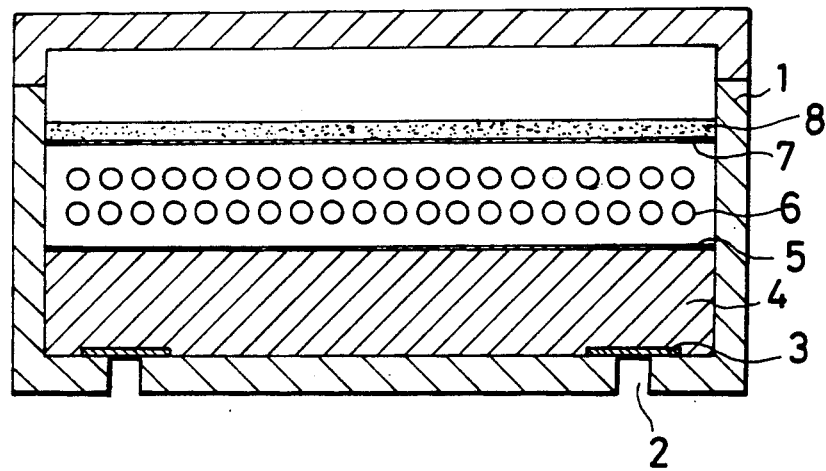
FIG. 1 is a sectional view of one example of a container for preserving fresh marine products according to the present invention.

Chlorates, chlorites and hypochlorites used in the present invention are not restricted, but the respective alkali metal salts and alkaline earth metal salts are preferable. The ratio of the salt (A) to the iron powder (B)

is not restricted, but it is preferably 1 to 50 parts by weight, and more preferably 2 to 30 parts by weight of the salt (A) based on 100 parts by weight of the iron powder (B).

The ratio of at least one oxide (C) selected from the group consisting of ferric oxide, cobalt oxide, nickel oxide, zinc oxide, titanium oxide, zirconium oxide, germanium oxide, copper oxide, silver oxide and manganese oxide to the iron powder (B) is also not restricted, but preferably 1 to 90 parts by weight, and more preferably 2 to 60 parts by weight based on 100 parts by weight of (B) the iron powder.

A process for preparing the preserving agent of the present invention is not specified, but a method of uniformly mixing the ingredient in the powdery state is simple and preferable.

The preserving agent of the present invention can be carried by or mixed with a porous carrier ordinarily used. Examples of preferable carriers are silica, alumina, silica alumina, zeolite, talc, diatomaceous earth, Kanuma soil, clay minerals, activated clay and active carbon, but the carrier is not restricted thereto.

The ratio of carrier is not restricted, but preferably 0 to 500 parts by weight, and more preferably 5 to 200 parts by weight based on 100 parts by weight of (B) the iron powder.

The deoxidizing rate of the preserving agent of the present invention is accelerated in the presence of water like other deoxidants containing iron powder as the main ingredient. In preserving fresh marine products, there is usually sufficient water in a container, and in this case no special care for adding water is necessary. However, in some cases, it is possible to use the above-described carrier or a water-absorbing polymer containing water.

The preserving agent of the present invention is different from conventional deoxidants in that it has an excellent deoxidizing activity at a low temperature, in that it has also total freshness maintaining effect on fresh marine products such as color change preventive effect and rot preventing effect and mold inhibiting effect, and in that it has color change preventive effect even if the cause of color change is not oxidation.

In the method (I) for preserving fresh marine products, fresh marine products are put into a container together with the preserving agent of the present invention and the container is sealed up or covered with a lid for preservation. The preserving agent is generally put into a bag having gas-permeability. The amount of preserving agent used is not restricted but is preferably so controlled that the oxygen concentration in the preserving atmosphere is maintained in the range of 0.5 to 5 vol%, preferably 0.5 to 3 vol %. If the oxygen concentration exceeds this range, complete prevention of color change is difficult, while if it is less than 0.5 vol%, anaerobic bacteria may propagate.

In addition, since the rate of color change is high, as described above, it is preferable not only to control the oxygen concentration range within the above-described range but also to adjust the oxygen concentration to the range as soon as possible. The time required to reduce the oxygen concentration to the above range, which is different depending upon marine products, cannot be determined indiscriminately but not more than 24 hours is appropriate.

The container used in the method (I) is not specified so long as it has a high airtightness. Polystyrene foam boxes may generally be used and general plastic bags of barrier films or plastic containers are also usable.

The temperature for preserving fresh marine products by using the preserving agent of the present invention is preferably as low as possible unless they freeze. Cooling with ice or cold storage in a refrigerator can generally provide preferable results. This is because the preserving agent of the present invention is aimed at preserving marine products in the raw state, but it goes without saying that the preserving agent of the present invention is adaptable under freezing and a sufficient effect can be expected.

The preserving agent of the present invention is effective for all fresh marine products in which change of color occurs. For example, the preserving agent is effective for preventing the colors of crustaceans such as lobster, shrimp, prawn and crab and red fishes such as red sea bream, red rockfish, bluefin searobin and alfonsino, etc. from changing into blackish colors or fading, preventing the change in color of tuna meat, yellowtail meat, etc., preventing browning of white meat fishes, preventing the change in color of a sardine, mackerel, etc., preventing browning of scallop, maintaining the qualities of sea urchin, pollack roe, etc., and preventing the change in color of squid and cuttlefish but the effects are not restricted thereto. In addition, the preserving agent of the present invention is effective for not only the prevention of change of color but also the maintenance of freshness by preventing rotting or the like. In this case, the marine products to be preserved is not restricted to marine products the colors of which are apt to change.

The method (II) for preserving fresh crustaceans of the present invention comprises the steps of putting fresh crustaceans into a container, sealing up the container or covering the container with a lid, and quickly adjusting the oxygen concentration within the container to 0.5 to 5 vol%, preferably 0.5 to 3 vol%. The term "quickly" here means within 24 hours, preferably within 16 hours.

If the oxygen concentration exceeds this range, it is difficult to completely prevent the color of fresh crustaceans from changing into blackish color, while if it is less than this range, anaerobic bacteria may propagate. In addition, since the rate of change of color into blackish color is high, as described above, it is preferable not only to control the oxygen concentration range but also to shorten the time for adjusting the oxygen concentration to the above-mentioned range as much as possible. As mentioned above, the time required to reduce the oxygen concentration to the above range is not more than 24 hours, preferably not more than 16 hours.

The oxygen concentration is preferably adjusted by using a deoxidant. In order to further enhance the effect of the method (II) of the present invention, preservation at a low temperature is preferable, and it is therefore necessary to select a deoxidant having a sufficient deoxidizing activity even at a low temperature. From this viewpoint, a composition comprising (A) at least one salt selected from the group consisting of chlorates, chlorites and hypochlorites and (B) iron powder will be cited as an example of an especially preferred deoxidant. Chlorates, chlorites and hypochlorites are not restricted, but the respective alkali metal salts and alkaline earth metal salts are preferable.

The ratio of at least one salt (A) selected from the group consisting of chlorates, chlorites and hypochlorites to the iron powder (B) is not restricted, but it is preferably 1 to 50 parts by weight, and more preferably 2 to 30 parts by weight based on 100 parts by weight of the iron powder (B).

As an especially preferable deoxidant, the above-described preserving agent for fresh marine products can be cited.

The deoxidant can be carried by or mixed with a porous carrier, as described above.

The deoxidizing rate of deoxidants is accelerated in the presence of water. In preserving crustaceans, there is usually sufficient water in a container, and in this case no special care for adding water is necessary. However, in some cases, it is possible to use the above-described carrier or a water-absorbing polymer containing water. When a deoxidant is used, it is generally put into a bag having gas-permeability. Since the deoxidants exemplified above not only are excellent in deoxidizing activity at a low temperature but also have effect for preventing fading of the color of crustaceans and preventing rotting, they are especially preferable as the deoxidant used in the method (II) of the present invention.

Crustaceans are exemplified by various shrimps, prawn, lobsters and crabs.

The container used in the method (II) of the present invention is not specified so long as it has a high airtightness. Polystyrene foam boxes may generally be used and general plastic bags of barrier films or plastic containers are also usable.

The preserving temperature is not specified but is actually preferably as low as possible unless crustaceans freeze. Cooling with ice or cold storage in a refrigerator can generally provide preferable results. This is because the method (II) of the present invention is aimed at preserving crustaceans in the raw state, but it goes without saying that this method is applicable under freezing and a sufficient effect can be expected.

According to the method (II) of the present invention, it is possible to prevent change of color in fresh crustaceans such as lobster, shrimp, prawn and crab, and avoid the degeneration of the quality thereof.

The present invention further relates to a container for preserving fresh marine products, which can be used in the methods (I) and (II).

In the case of transporting or storing fresh marine products in the state of being packed with ice, containers such as polystyrene foam boxes and water-proof corrugated cardboard boxes are used. In this case, holes are generally made in the bottom of a container so that the water from melted ice is drained therethrough. However, as described above, color of change in fresh marine products is mostly caused by oxidation due to oxygen in air. In order to prevent the oxidation, a method of replacing oxygen in the container with another gas or a method of removing the oxygen from the container may be considered. The above-described holes obstruct these methods because air passes through those holes. On the other hand, if the container without any hole is used the fresh marine products are soaked in the water from melted ice, whereby the freshness is lowered.

As a result of various studies on a container for transporting or storing fresh marine products in the state of being packed with ice which can drain water without letting external air into the container, the present inventors have found that such a container can be obtained by making holes for draining water therethrough in the bottom of the container and covering the inner or outer end of the hole or filling the hole with a water-permeable material such as paper, cloth and unwoven cloth. This is because a water-permeable material is permeable to water, but once it is wet with water, it becomes impermeable to gas such as air. When fresh marine products are actually put into a container of the present invention together with crushed ice and stored in a low-oxygen state by using a deoxidant, the water from melted ice is drained out of the container, and the low-oxygen state is held, thereby maintaining the freshness of the fresh marine products. The container of the present invention has been achieved on the basis of this finding.

That is, the present invention further relates to a container for use in preserving fresh marine products packed with ice, which is provided with holes for draining water therethrough made in the bottom thereof and the inner or outer end of the hole is covered with or the hole is filled with a water-permeable material, and a method for preserving fresh marine products comprising the steps of packing fresh marine products with ice in the container together with a deoxidant and covering the container with a lid.

There is no restriction in material for the container of the present invention so long as it has a barrier characteristic which is capable of maintaining a low-oxygen state. From the point of view of practical use, polystyrene foam boxes with a removable lid and water-proof corrugated cardboard boxes having a removable or hinged lid are preferable. At least one hole is formed in the bottom of the container and the inner or outer end of the hole is covered with or the hole is filled with a water-permeable material. The shape of the hole is not restricted so far as the purpose of the present invention can be achieved, and may be cylindrical, prismatic or convergent. The dimension or hole is appropriately selected based on the bottom area of the container.

The water-permeable material in the present invention means a material which is permeable to water, but which prevents the gas-permeability once it is wet with water. Any material having this nature is usable. Examples of a preferable material are water-proof paper, cloth or unwoven cloth. The water-permeable material may be placed on one of or both the ends of the hole or may be filled in the hole in a manner that the placed or filled material do not come out or move during preservation or storage.

The container of the present invention is aimed at for preserving fresh marine products packed in ice in a low-oxygen state. When fresh marine products are preserved, they are packed with ice in the container, a deoxidant (preserving agent for fresh marine products) is further put into the container, and the container is covered with a lid.

The present invention will be explained in more detail with the following non-limitative examples. "Part" in the examples represents a part by weight.

EXAMPLE 1

Live boreal prawn (Amaebi) caught off the coast of Noto were soaked in a large amount of iced water and allowed to stand for about 4 hours. 10 of those boreal prawns were sealed in an OPP film bag of 50 $\mu$m in thickness together with a water-repellent and gas-permeable bag filled with 10 g of a composition (preserving agent) comprising 300 parts of iron powder, 30 parts of calcium hypochlorite, 20 parts of ferric oxide and 50 parts of active carbon. The sealed package was preserved at 0° C.. Even after 4 days, the color was not changed into blackish color at the head portion and the tail portion in any boreal prawns. The pink color of the body was also maintained. In contrast, in all the boreal prawns preserved in the same way except that the preserving agent was not put into the OPP film bag, the colors were changed into blackish colors at the head and the tail portions, and the pink colors of the bodies faded and became yellowish as after whole 2 days. The oxygen concentration in the bag (OPP film bag) containing the preserving agent reduced to 1.7% in 16 hours, and substantially the same level was maintained for whole storing period. In contrast, the oxygen concentration in the bag (OPP film bag) without the preserving agent was 15% even after 4 days.

EXAMPLES 2 and 3

The same tests as in Example 1 were carried out except that sodium chlorite and sodium chlorate were respectively used in place of calcium hypochlorite. In each case, the color was not changed into blackish color at the head portion and the tail portion in any boreal prawns. The pink color of the body was also maintained. The oxygen concentration in the bag (OPP film bag) reduced to 1.8% in 16 hours, and thereafter was maintained at about 1.5%.

EXAMPLE 4

One red sea bream (Madai) was sealed in a polyethylene film bag of 50 μm in thickness together with a gas-permeable bag filled with 10 g of a preserving agent comprising 300 parts of iron powder, 30 parts of calcium hypochlorite, 20 parts of cobalt oxide and 50 parts of active carbon. The sealed package was preserved at 0° C. Even after 1 week, no change was observed in the color of the body and the freshness was wholly maintained.

EXAMPLES 5 to 12

Tests of preserving a red sea bream were carried out in the same way as in Example 4 except that nickel oxide, zinc oxide, titanium oxide, zirconium oxide, germanium oxide, copper oxide, silver oxide and manganese oxide, respectively, were used in place of cobalt oxide. In each of Examples, even after 1 week, no change was observed in the color of the body and the freshness was wholly maintained.

EXAMPLE 13

200 g of fillet of raw tuna meat was sealed in a polyethylene film bag of 50 μm in thickness together with a gas-permeable bag filled with 10 g of a preserving agent comprising 300 parts of iron powder, 20 parts of sodium hypochlorite, 15 parts of zinc oxide, 15 parts of ferric oxide and 50 parts of active carbon. The sealed package was preserved at 5°°C. Even after 3 days, the scarlet color was maintained and no dripping was observed. In contrast, in a piece of raw tuna meat which was preserved without the preserving agent, the color of the body faded with part thereof being changed into a greenish color, and dripping was observed.

EXAMPLE 14

20 fresh sardines were packed with ice in a polystyrene foam box (FIG. 1) together with a gas-permeable bag filled with 40 g of the preserving agent obtained in Example 13 and covered the box with a lid. The box was preserved at 5° C. Even after 5 days, no change was observed in the color of the body and the freshness was wholly maintained.

EXAMPLE 15

Live boreal prawns caught off the coast of Noto were immediately killed and 10 of them were sealed in an OPP film bag of 50 m in thickness together with a gas-permeable bag filled with 10 g of a deoxidant (preserving agent) comprising 300 parts of iron powder, 30 parts of calcium hypochlorite, 20 parts of zinc oxide and 50 parts of active carbon. The sealed package was preserved at 0° C.. Even after 4 days, the color was not changed into blackish color at the head portion and the tail portion in almost any boreal prawns. The pink color of the body was also maintained. In contrast, in all the boreal prawns preserved in the same way except that the deoxidant was not put into the bag, the colors were changed into blackish colors at the head and the tail portions, and the pink colors of the bodies faded and became yellowish after 2 days. The oxygen concentration in the bag (OPP bag) containing the deoxidant reduced to 1.5% in 16 hours, and substantially the same concentration even after 4 days. In contrast, the oxygen concentration in the bag containing no deoxidant was 15% even after 4 days.

EXAMPLES 16 and 17

The same tests as in Example 15 were carried out except that sodium chlorite and sodium chlorate were respectively used in place of calcium hypochlorite. In each Example, the color was not changed into blackish color at the head portion and the tail portion in any boreal prawns. The pink color of the body was also maintained. The oxygen concentration in the bag (OPP bag) reduced to 1.8% in 16 hours and was thereafter maintained in the range of 1 to 1.5%.

EXAMPLE 18

10 fresh tiger prawns (Kurumaebi) were sealed in an OPP film bag of 50 μm in thickness together with a gas-permeable bag filled with 10 g of a deoxidant comprising 300 parts of iron powder, 30 parts of calcium hypochlorite, 10 parts of ferric oxide, 10 parts of zinc oxide and 50 parts of active carbon. The sealed package was preserved at 0° C. Even after 4 days, the color was not changed into blackish color at the head portion and the tail portion in any prawn. The color of the body was also not changed in almost any prawn. In contrast, in the prawns preserved in the same way except that the deoxidant was not put into the bag, the colors were progressively changed into blackish colors at the head portions, and the colors of the bodies became wholly blackish after 2 days. The oxygen concentration in the bag (OPP bag) containing the deoxidant reduced to about 2% in 16 hours, and substantially the same even after 4 days. In contrast, the oxygen concentration in the bag containing no deoxidant was 17% even after 2 days.

EXAMPLE 19

One fresh pacific snow crab (Zuwai-Kani) was packed in a polystyrene foam box (FIG. 1) together with a gas-permeable bag filled with 20 g of a deoxidant comprising 200 parts of iron powder, 30 parts of calcium hypochlorite and 70 parts of active carbon. The box was preserved at 0° C. Even after 5 days, no change was observed in the color of the body and the freshness was wholly maintained. During this time, the oxygen concentration in the container (polystyrene foam box) reduced to about 3% in 16 hours after the start of the test and was thereafter maintained at 2 to 3%.

EXAMPLE 20

As shown in FIG. 1, at the four corners of the bottom of a polystyrene foam box 1 with a lid having a dimension of 34 cm in length, 52 cm in width and 13 cm in height, holes 2 (1 cm in diameter) for draining water therethrough were made. Polyester unwoven cloth 3 (Gurley permeability: 10 sec/100 ml of air) was applied on the inner end of each hole to produce a container for preserving fresh marine products. Crushed ice 4 was packed in the container and a partition 5 was placed on the crushed ice 4. 2.5 kg of fresh boreal prawns 6 caught on the day of the test were arranged on the partition 5. Another partitions 7 was placed on the boreal prawns 6, which were covered with a gas-permeable bag filled with 40 g of the deoxidant 8 used in Example 15. The container was covered with the lid to be preserved at 5° C. The oxygen concentration in the container was reduced to the order of 2% in 24 hours, and was gradually lowered until it became about 1% after 4 days. The low-oxygen state was maintained thereafter. During this time, the water from melted ice was drained out of the container through the unwoven cloth. The color of the boreal prawns was not changed into blackish color at the head portion and the tail portion after 6 days. The pink color of the body was also maintained. In contrast, in the boreal prawns preserved in the same way except that the deoxidant was not used, the colors were changed into blackish colors at the head and the tail portions after 2 days.

EXAMPLES 21 and 22

Containers for preserving fresh marine products were produced in the same way as in Example 20 except that cotton cloth and filtering paper were respectively used in place of the polyester unwoven cloth. As a result of a similar test, a substantially the same result was obtained in both cases.

EXAMPLE 23

A gas-permeable bag was filled with 20 g of a preserving agent comprising 200 parts by weight of iron powder, 20 parts by weight of calcium hypochlorite, 10 parts by weight of zinc oxide, 10 parts by weight of ferric oxide, 60 parts by weight of active carbon and 200 parts by weight of activated clay containing 20 parts by weight of water. Three trays loaded with 150 g of shucked sea urchin were sealed in an OPP film bag of 50 μm in thickness together with the preserving agent. The sealed package was preserved at 0° C. for 25 days. The fresh state was maintained without losing the original shape and putrid smell. In contrast, in the cases of shucked sea urchin which was preserved without the preserving agent, the original shape was wholly lost and there was putrid smell.

EXAMPLE 24

The same preservation test was carried out as in Example 23 except that 500 g of pollack roe was used in place of sea urchin and the preservation temperature was changed to 5° C.. While the pollack roe preserved without the preserving agent produced a change of color and bad smell, the pollack roe preserved together with the preserving agent was free from change of color and bad smell, and also had a good taste.

EXAMPLE 25

A gas-permeable bag was filled with 5 g of a preserving agent comprising 300 parts by weight of iron powder, 20 parts by weight of calcium hypochlorite, 10 parts by weight of zinc oxide, 10 parts by weight of ferric oxide, and 60 parts by weight of active carbon. 2 slices of yellowtail meat were sealed in a nylon/polyethylene bag of 30 μm in thickness together with the preserving agent. The sealed package was preserved at 0° C. for 2 days. While in the package without the preserving agent, the change of color was remarkable on the surface of the meat, the fresh state of the meat was maintained in the package containing the preserving agent.

EXAMPLE 26

Ice was packed in the polystyrene foam container shown in FIG. 1, and 2 alfonsino were placed thereon. A gas-permeable bag filled with 20 g of the preserving agent used in Example 25 was further placed thereon. The container was covered with the lid and sealed with an adhesive tape. The container was preserved at 2° C. for 6 days. While the meat of fish was kept white and the viscera were firm in the container containing the preserving agent, the color of the meat of fish changed into reddish color and the viscera lost the original shape, in other words, the freshness was greatly lowered in the container without the preserving agent.

What is claimed is:

1. A method for preserving fresh marine products, which comprises putting said fresh marine products and a preserving agent comprising (A) at least one salt selected from the group consisting of chlorates, chlorites and hypochlorites; (B) iron powder; and (C) at least one oxide selected from the group consisting of ferric oxide, cobalt oxide, nickel oxide, zinc oxide, titanium oxide, zirconium oxide, germanium oxide, copper oxide, silver oxide and manganese oxide, into a container and adjusting the oxygen concentration within said container to the range of 0.5 to 5 vol %, the concentration being maintained in the range thereafter.

2. The method for preserving fresh marine products according to claim 1, wherein the ratio of said (A), (B) and (C) is 1 to 50:100:1 to 90 by weight ratio.

3. The method of preserving fresh marine products according to claim 1 or 2, wherein said (A) is calcium hypochlorite.

4. The method for preserving fresh marine products according to claim 1 or 2, wherein said fresh marine products are crustaleans or sea urchin.

* * * * *